:::
United States Patent Office 3,410,723
Patented Nov. 12, 1968

3,410,723
PROCESS FOR TREATING GLASS CATHODE-RAY TUBE ENVELOPES
Samuel N. Cohz, Toledo, Ohio, assignor to Owens-Illinois, Inc., a corporation of Ohio
No Drawing. Filed Dec. 21, 1962, Ser. No. 247,467
6 Claims. (Cl. 134—22)

This invention relates to a process for substantially removing adsorbed nitric oxide from siliceous surfaces. More particularly, this invention relates to a process for removing adsorbed nitric oxide from the inner surfaces of glass cathode-ray tube envelopes, and to the envelopes thus formed.

In many processes for producing glass cathode-ray tube envelopes, the glass funnel portion is sealed to the glass face plate by the method disclosed in U.S. Patent 2,306,054, wherein the adjacent contacting glass edges are heated by gas flames while the envelope is rotated, and a current of electricity is introduced into the heated contacting edges by a pair of electrodes having their tips close to but spaced from the envelope and having a potential difference sufficient to cause an electric current to flow through the glass between the electrodes. This process is referred to as an electric arc-melting process.

The cathode ray tube envelopes are then shipped to the television picture tube manufacturer who first treats the inner surface of the envelopes prior to applying a layer of cathodoluminescent phosphor material to the face plate and then seals the cathode ray gun in place within the envelope. Before the bulb is closed, it is evacuated and baked out by known methods to remove most of the inert and active gases from the interior of the bulb, since the presence of such gases would otherwise impair the efficiency of the cathode-ray tube and would decrease its useful operational life.

In order to assure that the inside of the envelopes are absolutely clean and free from dirt, grease and other foreign materials which would otherwise impair the efficiency of the cathode-ray tubes during operation, each envelope is pretreated by the manufacturer prior to assembling the tube. One pretreatment process includes several washings with an aqueous HF solution of 6–8% concentration followed by washing with water and then with a caustic neutralizer, such as 10–12% NaOH, followed by additional washings with water. Another known pretreatment process uses aqueous NaOH as the wash solution. After the envelopes are pretreated by the washing step, the cathode-ray tubes are assembled in the usual manner.

It has now been found that during the sealing of the glass funnel to the glass plate to form the envelope, nitric oxide is formed from the nitrogen and oxygen present in the air within the tube, and the NO appears to tenaciously adhere to the inner surface of the glass envelope. This is a physical surface adsorption phenomenon and not a function of the glass composition. The presence of nitric oxide in adsorbed form on the interior surface of cathode-ray tubes contributes to the short life of the tube since it leads to the poisoning of the electrodes of the cathode-ray gun and their subsequent failure. Even when the cathode-ray tube is exhausted to a pressure of $10^{-6}$ mm. prior to closing of the bulb, a large amount of NO remains adsorbed on the surface of the tube. As the tube is operated in a television receiver for a period of time, the high temperatures to which the inner surfaces of the tube are subjected continuously liberate some of the NO as a gas which remains within the bulb and eventually comes into contact with the components of the cathode-ray gun. Examination of a large number of poisoned cathodes showed a high thermal evolution of NO when the cathode was baked out.

Accordingly, it is an object of this invention to obviate the difficulties presently encountered with cathode-ray tubes wherein the tubes have a relatively short operating life due to failure of the electrodes of the cathode-ray guns.

Another object of this invention is to provide a method for quickly and easily removing nitric oxide adsorbed on a siliceous surface.

A further object of this invention is to provide a method for treating the inner surfaces of hollow glass containers having adsorbed nitric oxide adhering to such surfaces, and removing the nitric oxide therefrom.

A further object of this invention is to quickly, easily, and economically treat the inner surfaces of a glass cathode-ray tube envelope and remove adsorbed NO therefrom so as to increase the operating life of the tube without materially affecting the cost of the finished tube.

In attaining the objects of this invention, one feature resides in contacting the siliceous surfaces having nitric oxide adsorbed thereon with an agent which reacts with the nitric oxide to form a soluble reaction product therewith and then removing the nitric oxid-reaction product from the siliceous surface.

Another feature resides in contacting a glass surface having nitric oxide tenaciously adhering thereto, with an aqueous solution of an agent which reacts with the nitric oxide to form a water-soluble reaction product therewith, and then removing the solution containing the formed product from the glass surface.

Other objects, features, and advantages of the invention will be more apparent to those skilled in the art from the following disclosure.

It has been found that when a hot aqueous solution containing a chemical agent capable of reacting with nitric oxide is added to the inside of a cathode-ray tube, and agitated therein for a short period of time, the adhered nitric oxide forms a water-soluble reaction product with the agent, which reaction product is removed with the aqueous solution. For substantially complete removal of the nitric oxide, two or three washings with the hot solutions of the agent are preferred, followed by a rinsing of the inner surface of the cathode-ray tube to remove all traces of the solution.

The following examples are merely illustrative of the invention and are not to be considered as limiting the scope of the invention in any manner.

In each of the following examples, the television bulb was first heated to a temperature of 120° C. and then evacuated to a vacuum of $10^{-6}$ mm. of mercury and the vacuum was shut off. The evacuated bulb was then heated up to 420° C. over a period of about 35 minutes. A small aliquot portion of the gas sample within the bulb was passed into a mass spectrometer (Consolidated Electro-Dynamics Model 21–103C) and measured. The sample was analyzed for the constituents including nitric oxide and the partial pressure of nitric oxide was obtained. From the total pressure of the gas sample the mol percent of nitric oxide was then calculated.

In using a mass spectrometer, a control gas, such as nitric oxide, is first introduced at a known pressure and the height of the peak on the spectrometer is measured. When a sample containing the same gas, nitric oxide, is then introduced into the spectrometer, its peak height is measured, and the partial pressure attributed to nitric oxide is readily ascertained. Dividing the partial pressure of the nitric oxide by the total pressure of the sample gas removed from the cathode-ray tube results in the mole percent of nitric oxide in the sample.

The washing technique applied to all samples wherein the agents of the invention were utilized consisted of three successive washings with an aqueous solution of the agent followed by three successive distilled water rinses. An agitating action to swirl the wash solutions was used, and the temperatures of the cleaning solutions and the rinse water were approximately 80° to 90° C. Each individual washing and rinsing lasted from about three to five minutes. The bulbs were then drained and dried by evacuating with a force pump.

EXAMPLE I

A 19"114° television bulb was removed from the production line where the funnel portion had been sealed to the face plate. The bulb was not washed but heated and evacuated as described above. From the mass spectrometer analysis, it was calculated that the nitric oxide formed 60.7% of the total gas collected during the heating cycle to 420° C.

EXAMPLE II

A television bulb from the same production run as in Example I was washed for 12 seconds with a 6% NaOH solution, which solution was at a temperature of 150° F. The solution was removed and the bulb was rinsed with de-ionized water. The bulb was then evacuated and heated as described above, and the analysis of the gas collected during the heating cycle to 420° C. showed the presence of 20% nitric oxide in the total gas removed.

EXAMPLE III

A bulb from the same production run as in Example I was first washed with a 6% NaOH solution as described in Example II. The pretreated bulb was then washed with a 0.2 M $Na_2HPO_4$ solution in the manner described above regarding the agents of the invention. Analysis of the total gases collected during the heat-up cycle indicated that 0.7% NO was present.

EXAMPLE IV

A television bulb of the same production run as in Example I was washed with a 1.0% aqueous solution of a dioctyl ester of sodium sulfosuccinic acid and then rinsed in distilled water at room temperature in the manner defined above. The calculated percent of NO present in the gas at 420° C. was 1.3%.

EXAMPLE V

A television bulb of the same production run as in Example I was washed with a 0.1 M aqueous solution of $Na_4P_2O_7 \cdot 10H_2O$ and 0.5% NO was detected.

EXAMPLE VI

Using an aqueous wash solution of 0.1 M of $SnCl_4$ to treat the inside of a TV bulb from the same run as in Example I, 0.2% NO was detected at the end of the heat-up cycle.

EXAMPLE VII

Following the procedure in Example II but using a 0.1 M aqueous solution of $SbCl_3$, 0.2% of NO was measured in the bulb at the end of the heat-up cycle.

EXAMPLE VIII

When the procedure of Example VI was followed except that a 0.1 M aqueous solution of $AlCl_3$ was used as the wash agent, 0.3% of NO was present at the end of the heat-up cycle.

EXAMPLE IX

A 0.5 M sodium bisulfite solution was prepared by dissolving the $NaHSO_3$ in hot distilled water at a temperature of 70° C. The inside of a television tube off the production line was washed three times for a period of 3 minutes per wash, followed by three rinses with hot distilled water (70° C.), each rinse of a three minute duration. At the end of the heat cycle, no nitric oxide was detected.

EXAMPLE X

A 19"114° TV bulb, removed from a production line, was washed 3 times with a hot (80° C.) aqueous solution of 0.2 M sodium sulfate, $Na_2SO_4$, and then rinsed, all in accordance with the process described above. Analysis of the bulb in the mass spectrometer showed only a trace of NO.

From the above, it will be evident that a process has been described for quickly and easily removing the adhered NO from the inner surfaces of a television tube envelope by using an aqueous solution of an agent capable of reacting with the adhering NO and forming a water-soluble reaction product which can readily be removed with the solution. On the other hand, tube envelopes which have undergone the usual washing steps of the prior art and are then heated and evacuated in the same manner as the envelopes in each of the above examples, have anywhere from about 20 to 50 mole percent of the total gas collected during the heating cycle to 420° C., consist of nitric oxide.

The chemical agent which will react with the nitric oxide to form the water-soluble reaction product may be either an inorganic or an organic agent. Examples of the inorganic agents which may be used in the process of the invention include the alkali metal sulfates and bisulfates, alkali metal sulfites and bisulfites, and alkali metal sulfides, such as sodium sulfate, potassium sulfite, sodium hydrogen sulfate, sodium sulfide, potassium hydrogen sulfite, potassium sulfide, and the like. Alkali metal thiosulfates, such as sodium thiosulfate ($Na_2S_2O_3$); alkali metal salts of phosphoric acids including $Na_2HPO_4$, $Na_2P_2O_7 \cdot 10H_2O$, $Na_3PO_4 \cdot 12H_2O$; and the like, are also examples of inorganic agents suitable for purposes of the invention. Also included are the chlorides and the sulfates of metals such as aluminum, tin, antimony, magnesium, zinc, iron, and the like, and, more specifically, aluminum chloride, antimony chloride, tin chloride, aluminum sulfate, and the like.

The organic agents suitable for the purposes of the invention include the alkyl aryl sulfonates and the alkali metal salts thereof and particularly those sulfonates wherein the alkyl is a lower alkyl, such as one having from 1 to 6 C atoms, and the aryl is either benzyl, phenyl, or naphthyl. Among alkyl aryl sulfonates found satisfactory for purposes of this invention are included those sold under the trademarks Naccoton-A and Nacconal-NR. Other suitable organic agents include alkyl esters of alkali metal sulfodicarboxylic acids such as dioctyl ester of sodium sulfosuccinic acid; sodium salt of a sulfate ester of an alkyl phenoxypoly(ethyleneoxy)ethanol; alkylphenylpolyethylene glycol ether wherein the alkyl is preferably octyl or nonyl; sulfated esters of fatty acids such as lauryl, stearyl, palmitic, oleic, etc.; amide salts of lower alcohols including ethanolamide, diethanolamide, triethanolamide, etc.; N-nitrosodimethylamine; and the like.

As is evident from the above, any water-soluble chemical agent capable of reacting wtih nitric oxide to form a water-soluble reaction product therewith is suitable for the purpose of this invention. The above are merely illustrative examples and are not to be considered limiting the invention in any manner.

While it has been found that a 0.1 to 1 M solution of the chemical agent provides excellent results in removing the nitric oxide from its adsorbed position on the glass surface, it has been found that good results are achieved when from 0.1 to 0.5 M solution is utilized. When more than 0.5 M of the chemical agent is present, it does not materially affect the rate of removal of the nitric oxide and merely is added cost to the process.

Less than 0.1 M chemical agent may be in the hot washing solution, but the length of time necessary to remove the nitric oxide is accordingly increased. Thus, 0.05 M of chemical agent will still give good results if used over a longer period of time.

When reference is made to a hot aqueous washing solution, it is meant to include aqueous solutions having a temperature range of from about 50° C. to 100° C. Temperatures less than 50° C. may be used, but, as expected, the reaction rate decreases accordingly, thus increasing the time which is necessary for adequate washing. Since it is more difficult to conduct the process at 100° C., a preferred range is from 70 to 80° C., although good results are also obtained when the temperature of the wash solution is as low as 50° C., although the length of time for the reaction is accordingly increased.

By the process of this invention disclosed above, the glass surfaces of a cathode-ray tube envelope may be made substatnially free of adhered nitric oxide. By the term "substantially free" is meant having about 1% or less of the total gas evolved during a bake-out cycle, expressed as mol percent, consist of nitric oxide. However, it is to be understood that even if about 10% of evolved gas is nitric oxide, this is still a drastic improvement over the cathode-ray tubes heretofore made, thus assuring a longer operating life for tubes which have been treated in accordance with the present invention. When reference is made to aqueous solutions of metal salts, such as $AlCl_3$, it is to be understood that this term includes the hydrolysis products present in the aqueous medium.

Having fully described the invention, what is claimed is:

1. The method of treating the inner surface of a glass cathode-ray tube envelope to remove adsorbed nitric oxide contaminants therefrom comprising applying a solution of a chemical agent to said inner surface and reacting said chemical agent with said adsorbed nitric oxide contaminants to form a reaction product soluble in said solution, and removing said solution and said reaction product from said inner surface, said chemical agent being selected from the group consisting of sodium sulfate, sodium bisulfite, $AlCl_3$, $SbCl_3$ and $SnCl_4$.

2. The method as defined in claim 1 wherein said inorganic chemical agent is sodium sulfate.

3. The method as defined in claim 1 wherein said inorganic chemical agent is sodium bisulfite.

4. The method as defined in claim 1 wherein said inorganic chemical agent is $AlCl_3$.

5. The method as defined in claim 1 wherein said inorganic chemical agent is $SbCl_3$.

6. The method as defined in claim 1 wherein said inorganic chemical agent is $Sn Cl_4$.

References Cited

UNITED STATES PATENTS

| | | | |
|---|---|---|---|
| 2,714,565 | 8/1955 | Heywang | 134—22 |
| 2,726,180 | 12/1955 | Stankey | 134—22 |
| 2,968,741 | 1/1961 | Frazier | 313—64 |
| 3,005,122 | 10/1961 | Coleman et al. | 313—64 |
| 2,383,470 | 8/1945 | Morgan. | |
| 2,475,194 | 7/1949 | Nyquist et al. | 117—54 XR |
| 2,560,273 | 7/1951 | Briganti et al. | 134—22 XR |
| 2,686,138 | 8/1954 | Klein. | |
| 2,709,644 | 5/1955 | Gustin | 117—54 XR |
| 2,757,104 | 7/1956 | Howes | 117—54—XR |
| 2,879,175 | 3/1959 | Umblia | 117—54 XR |
| 3,205,555 | 9/1965 | Balde et al. | |

MORRIS O. WOLK, *Primary Examiner.*

J. ZATARGA, *Assistant Examiner.*